United States Patent
Krumszyn et al.

[11] Patent Number: 5,438,761
[45] Date of Patent: Aug. 8, 1995

[54] ROTATABLE CARPENTER'S LEVEL

[76] Inventors: Luba M. Krumszyn; Zinovi Khabal, both of 125 The Crossway, Yonkers, N.Y. 10701

[21] Appl. No.: 121,540

[22] Filed: Sep. 16, 1993

[51] Int. Cl.[6] .................. B43L 7/10; G01C 9/24
[52] U.S. Cl. ...................... 33/451; 33/375; 33/452
[58] Field of Search ............... 33/451, 374, 375, 383, 33/384, 385, 387, 388, 389, 703, 705, 415, 416, 417, 457

[56] References Cited

U.S. PATENT DOCUMENTS

| | | | |
|---|---|---|---|
| 775,483 | 11/1904 | Whitehouse | 33/387 |
| 1,454,693 | 5/1923 | Schlattau | 33/383 |
| 2,471,327 | 5/1949 | Hunt | 33/384 |
| 2,640,268 | 6/1953 | Thompson | 33/451 |
| 2,691,829 | 10/1954 | Arana | 33/383 |
| 2,692,440 | 10/1954 | Walters | 33/383 |
| 3,187,437 | 6/1965 | Ellis | 33/451 |
| 3,783,525 | 1/1974 | Bloxom | 33/383 |
| 4,073,062 | 2/1978 | Wright | 33/388 |
| 4,813,149 | 3/1989 | Herkimer | 33/451 |
| 5,177,873 | 1/1993 | Tate | 33/385 |

FOREIGN PATENT DOCUMENTS

410573  3/1910  France .................. 33/451

Primary Examiner—Christopher W. Fulton
Attorney, Agent, or Firm—Charles E. Baxley

[57] ABSTRACT

A level apparatus incorporates a ruler member for making linear measurements and a level support assembly which is rotatably mounted on the ruler member. The level support assembly is mounted in the center of the ruler member and includes a pair of brackets which support a cylindrically shaped level. The level support assembly includes a circular array of indicia for making angular measurements.

4 Claims, 9 Drawing Sheets

ROTATABLE CARPENTER'S LEVEL

BACKGROUND OF THE INVENTION

This invention relates generally to the field of carpenter's levels, and more particularly to a carpenter's level which includes a rotatable hub having a leveling mechanism.

The prior art related to carpenter's levels includes the following apparatus.

U.S. Pat. No. 657,443 to C. L. Newton shows a spirit level which is combined with a pair of angular jaws and a punch for marking cylindrical shafts.

U.S. Pat. No. 895,560 to C. E. Level shows a spirit level which is combined with a pair of adjustable arms for the measurement of miter joints.

U.S. Pat. No. 1,982,178 to B. Rudolff shows a spirit level which incorporates a detachable blade for the measurement of workpieces.

U.S. Des 141,088 to W. F. Boyce shows a spirit level which is combined with a pair of angular jaws and a scriber.

U.S. Pat. No. 2,859,527 to W. J. Roche shows a carpenter's level which incorporates a guide having a groove which receives a line level which projects downward in order to maintain the guide in a horizontal position to determine the amount of rise or fall in the work relative to the horizontal.

All of the apparatus in the prior art is relatively complex and subject to damage during use or transportation to and from the worksite.

OBJECTS AND SUMMARY OF THE INVENTION

It is an object of the present invention to provide a rotatable carpenter's level which incorporates a ruler, mounted for rotation about a hub which contains a leveling mechanism.

Another object of the present invention is to provide a rotatable carpenter's level which incorporates protective windows to protect the spirit level during both use and storage.

Another object of the present invention is to provide a rotatable carpenter's level which is capable of withstanding shock forces encountered during transportation and use.

Yet another object of the present invention is to provide a rotatable carpenter's level which includes a relatively small number of component parts which are relatively simple to manufacture resulting in a relatively low overall cost.

The foregoing and other objects and advantages of the invention will appear more clearly hereinafter.

In accordance with the present invention there is provided a rotatable carpenter's level which includes a ruler having a central hub within which there is mounted a rotatable leveling mechanism. In the primary embodiment, the ruler has the form of a flat generally rectangular plate with the central hub projecting from two surfaces of the plate. The central hub includes a rotatably mounted ring member which is connected to a carrier which supports a spirit level. A first window is mounted on the ruler. The first and second windows define an interior space within which the carrier and the spirit level are mounted. The windows serve to protect the level from dirt and damage during both use and storage. The ruler has a linear array of indicia and the central hub has a circular array of indicia. The ring portion has an index mark which facilitates the making of angular measurements.

In an additional embodiment of the invention, the ruler has a pair of flange portions each of which has a linear array of indicia.

In each of the above embodiments of the invention the spirit level, which has a generally cylindrical configuration, is supported by a pair of brackets which are formed of a resilient plastic material. These brackets provide the capability for rapid and accurate assembly of the apparatus with a degree of protection for the spirit level against damage due to shock forces encountered during use.

In another embodiment of the invention, a dial readout provides a reading of an angle which is formed between a level support member and a pivotally mounted ruler.

In still another embodiment of the invention, the ruler which supports the level includes a pair of pivotally mounted members for measurement of angles.

DESCRIPTION OF THE DRAWINGS

Other important objects and advantages of the invention will be apparent from the following detailed description taken in conjunction with the accompanying drawings in which.

DETAILED DESCRIPTION OF THE INVENTION

Figure 1:
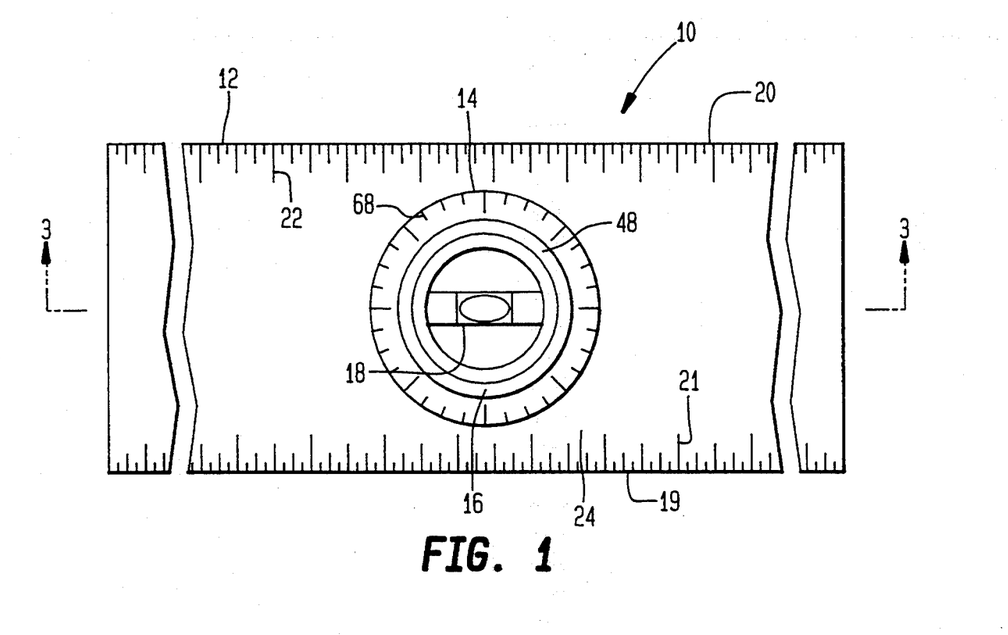
FIG. 1 is a plan view of the rotatable carpenter's level of the present invention.
Figure 2:
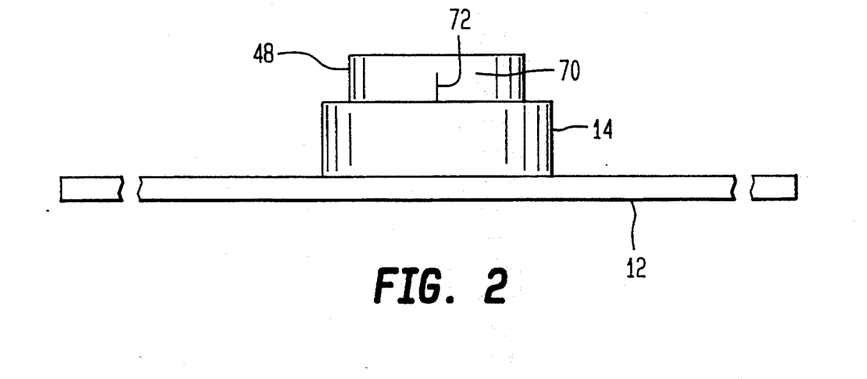
FIG. 2 is a side elevation view of the apparatus of FIG. 1.

With reference to the drawings there is shown in FIG. 1 a rotatable carpenter's level 10 made in accordance with the present invention which includes: a ruler member 12, a central hub and a leveling mechanism 16 which is rotatably mounted in the central hub 14 and which supports a spirit or bubble level 18. The ruler member 12 is generally flat and rectangular in configuration and as is shown in FIG. 1, the edges 19, 20 of the ruler member 12 include a linear array of indicia 21, 22 for making linear measurements.

Figure 3:
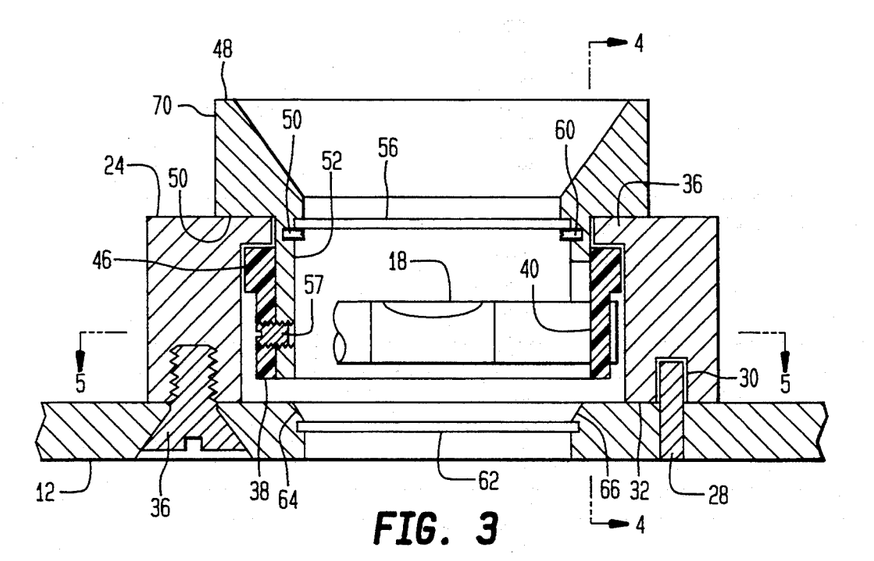
FIG. 3 is a cross-sectional view taken along the line 3—3 of FIG. 1.

The central hub 14 is generally cylindrical in configuration and is attached to the central portion 24 of the ruler member 12 by a pair of screws 26, one of which is shown in FIG. 3. The pin 28 is press-fit into the ruler member 12 and projects into the hole 30 located on the bottom surface 32 of the central hub 14. The upper surface 34 of the central hub 14 has a lip portion 36 which cooperates with the level support ring 38 in a manner which will be presently described.

Figure 4:
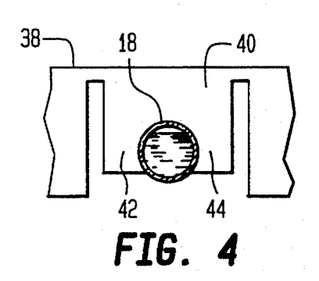
FIG. 4 is a cross-sectional view taken along the line 4—4 in FIG. 3.
Figure 5:
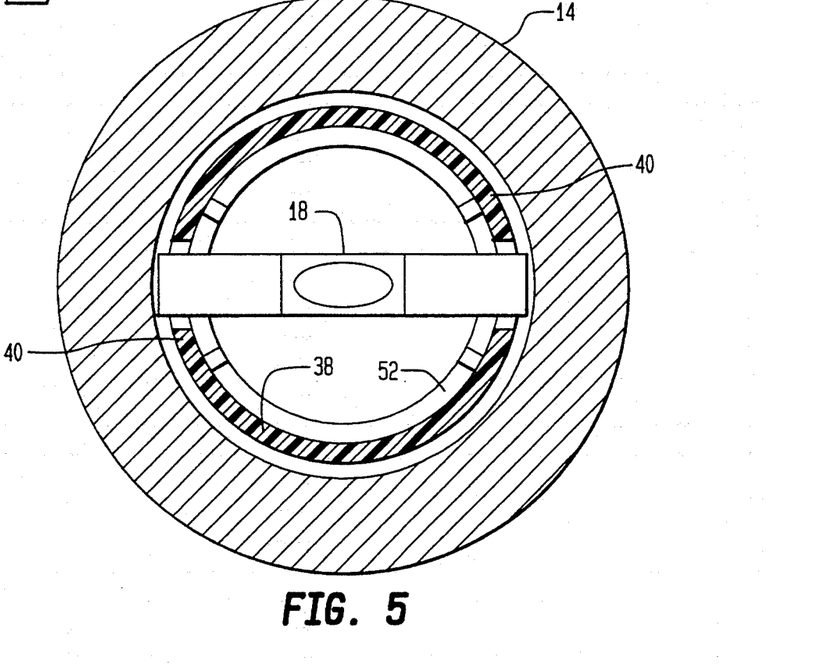
FIG. 5 is a cross-sectional view taken along the line 5—5 in FIG. 3.

The level support ring 38 is generally cylindrical and fits within the central hub 14 as is shown in FIG. 3. The level support ring 38 has a pair of oppositely spaced and integrally formed level support brackets typically designated by the numeral 40. One of the brackets 40 is shown in FIGS. 3 and 4. As is shown in FIG. 4, the level support bracket 40 partially encircles the spirit level 18 and the arm portions 42, 44 of the level support bracket 40 snap-fit around the spirit level 18 and hold the spirit level 18 securely. The level support ring 38 and the integrally formed level support bracket 40 are preferably formed of a resilient plastic material. The resilience of the arm portions 42, 44 enables the level support bracket 40 to flex, to a degree, in order to absorb shock forces encountered by the rotatable carpenter's level 10 while continuing to hold the spirit level 18 securely and accurately in place.

The level support ring 38 has a lip portion 46 which abuts the lip portion 36 of the central hub 14 and prevents disengagement of the level support ring 38 from the central hub 14 as is shown in FIG. 3. A bezel member 48 rests on the top surface 50 of the central hub member 14 and has a portion 52 which projects into the central hub member 14 and abuts the level support ring 38. The level support ring 38 and the portion 52 of the bezel member 48 are connected by a plurality of screws, one of which 54, is shown in FIG. 3.

The bezel member 48 includes a window 56 which may be made of glass or plastic and which is held in place by screws 58, 60. The ruler member 12 includes a similar window 62 which is held in place by locally staking or deforming the metal surface of the ruler to form overlapping portions 64, 66, as is shown in FIG. 3. Alternatively, the window 62 may be held in place by means of an adhesive layer in a known manner. The windows 56, 62 facilitate viewing the level 18 while protecting the level 18 from dirt and damage due to puncture during both use and storage.

The upper surface 50 of the central hub 14 includes a circular array of indicia 68 as is shown in FIG. 1 and the surface 70 of the bezel member 48 includes at least one index marking 72 thereby facilitating performance of angular measurements relative to the horizontal.

FIGS. 6–12 show another embodiment of the carpenter's level 100 according to the present invention. The embodiment 100 incorporates a ruler 102 which has a pair of integrally formed flange portions 104, 106 each of which has a linear array of indicia 108, 110 for making linear measurements and a central hub assembly 112. The central hub assembly 112 includes an upper hub member 114, a lower hub 116 member, an upper member 118, which supports a window 120 and which also supports a spirit level 122 in a manner which will be presently described.

Figure 6:
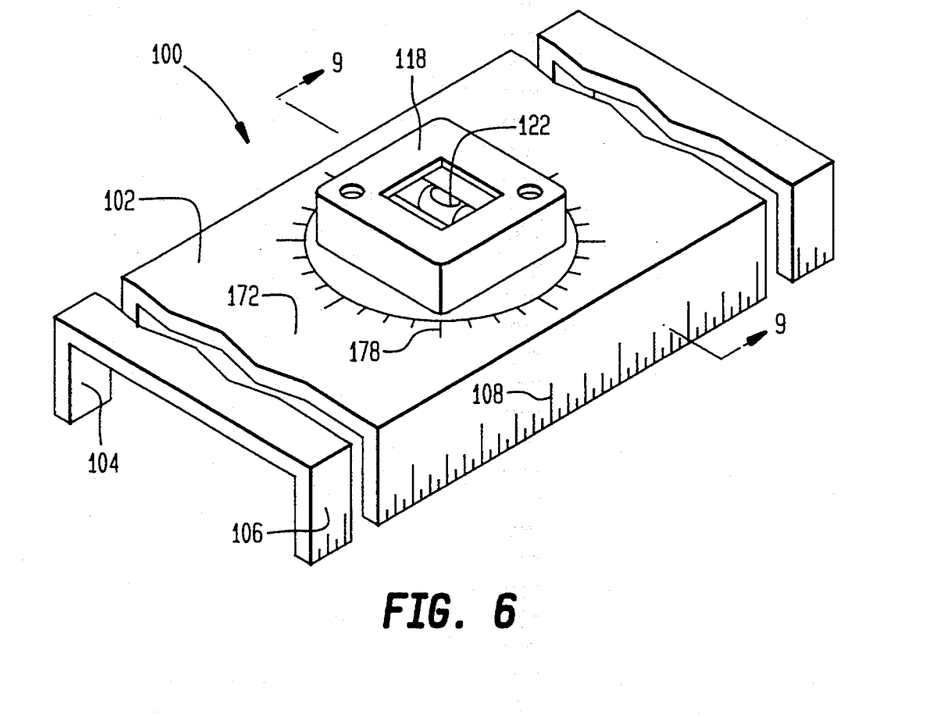
FIG. 6 is a perspective view of another embodiment of the rotatable carpenter's level of the present invention.
Figures 7, 8:
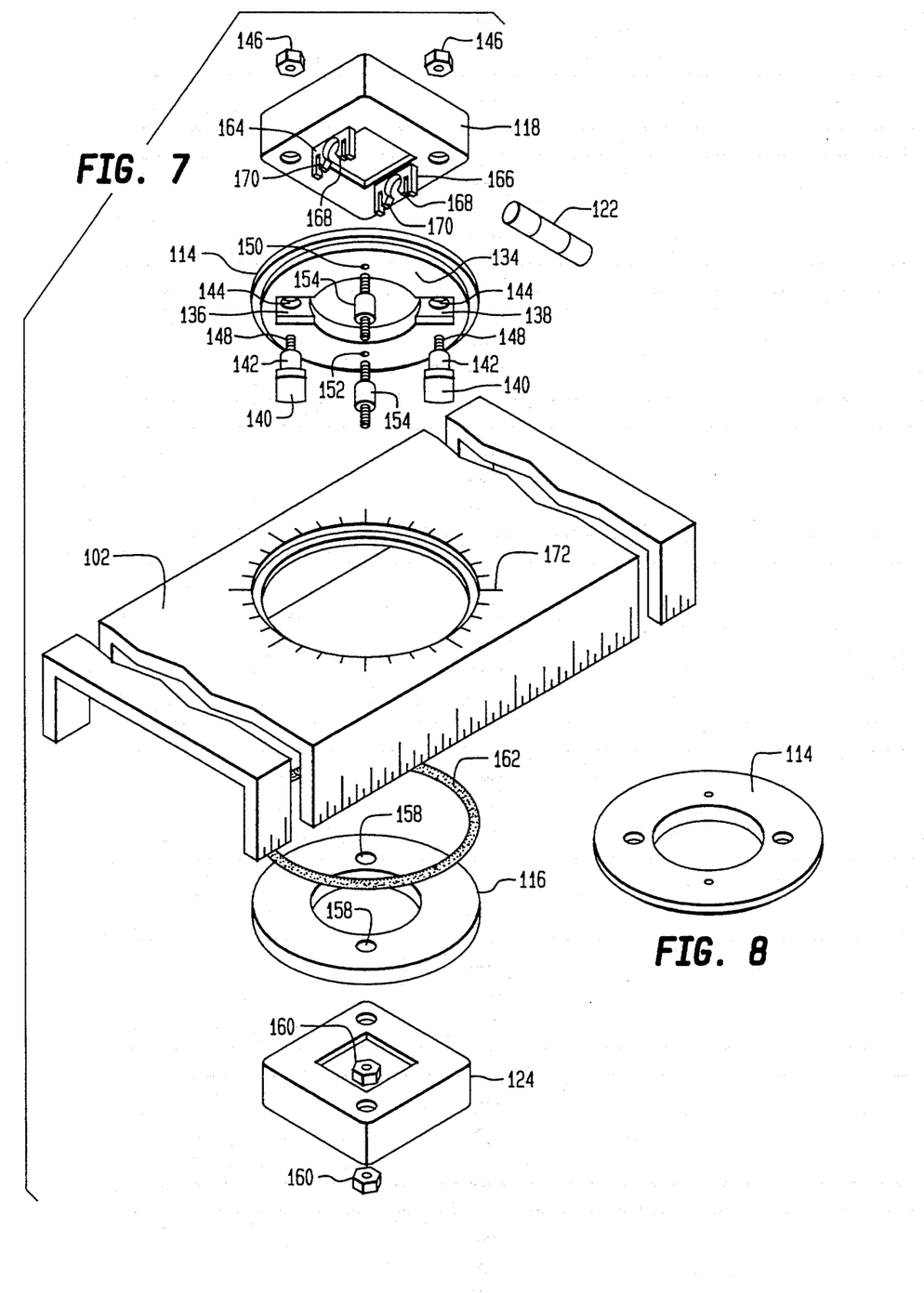
FIG. 7 is an exploded view of the embodiment shown in FIG. 6.
FIG. 8 is a perspective view of the upper surface of he upper hub member of the embodiment shown in FIG. 6.

The central hub assembly 112 also includes a lower member 124 which supports a window 126.

Figure 9:
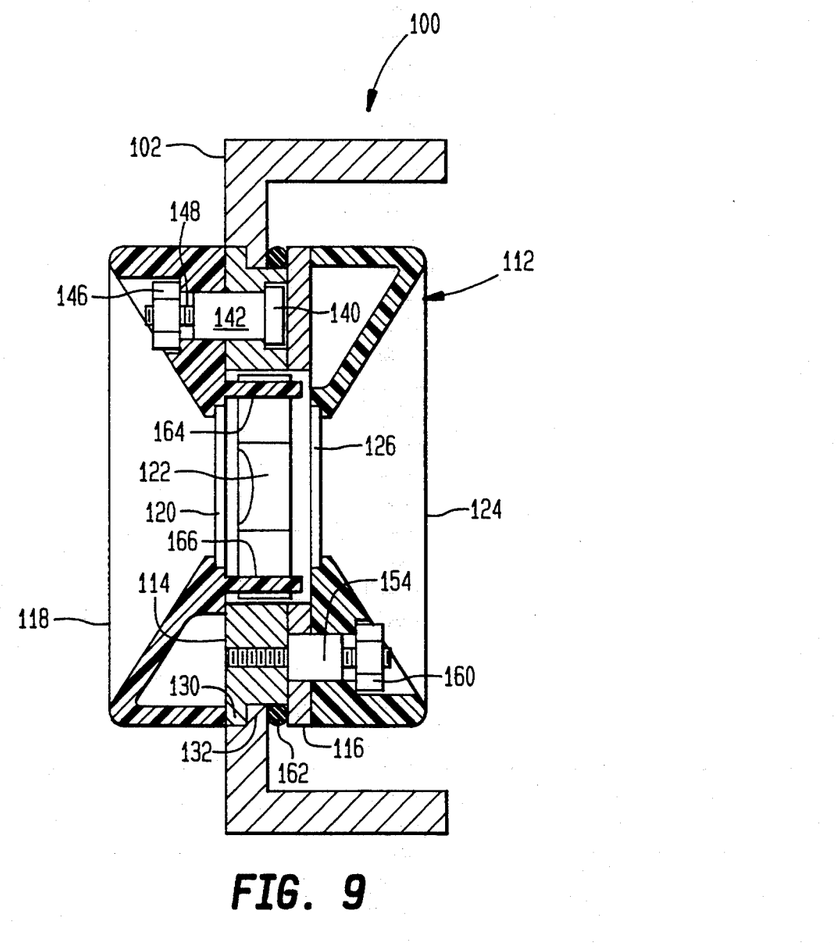
FIG. 9 is a cross-sectional view taken along the line 9—9 of FIG. 6, with the hub shown rotated ninety degrees.
Figure 10:
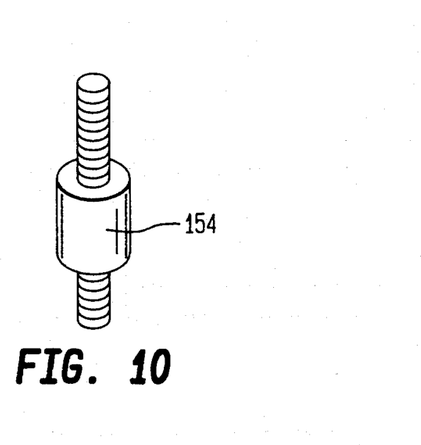
FIG. 10 is a perspective view of a stud shown removed from the embodiment of FIG. 6.
Figure 11:
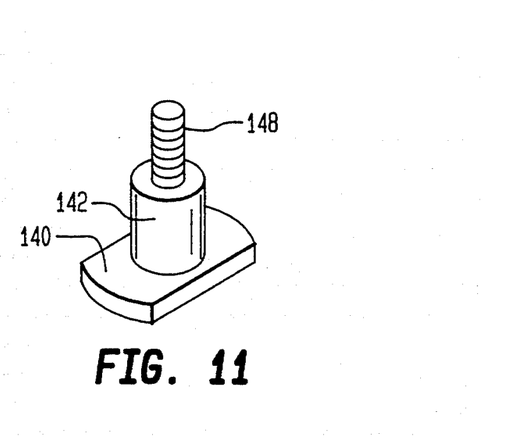
FIG. 11 is a perspective view of another stud shown removed from the embodiment of FIG. 6.
Figure 12:
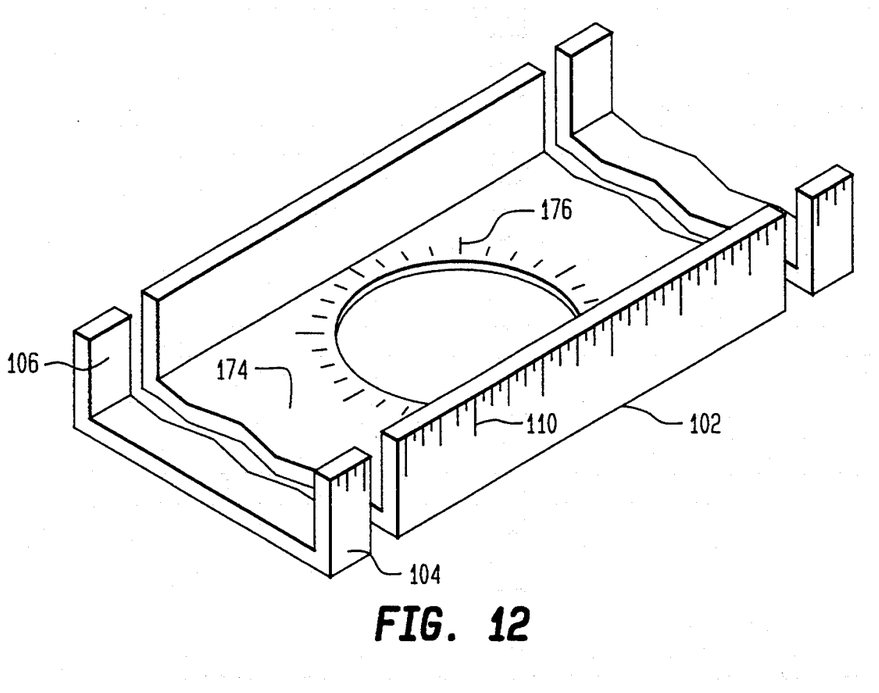
FIG. 12 is a perspective view of the ruler member shown removed from the embodiment of FIG. 6.

The upper hub member 114 is rotatably mounted in a central aperture 128 formed in the ruler 102 member, as best shown in FIGS. 7 and 9. The upper hub member 114 includes a lip portion 130 which is supported by a lip portion 132 formed in the ruler member 102. The lower surface 134 of the upper hub member 114 includes a pair of recess portions 136, 138 each of which accepts the head 140 of a stud member 142 which projects through a clearance hole 144 in the upper member 114. A nut 146 engages the end 148 of the stud 142 as is shown in FIG. 9 thereby holding the upper member 118 and the upper hub member 114 together. The upper hub member 114 has a pair of threaded holes 150, 152 in which stud members 154 are engaged. Studs 154 also project into holes 158 formed in the lower member 124 and are secured by nuts 160. The upper member 118 member and the lower member 124 member support windows 124, 126 as is shown in FIG. 9. A resilient O-ring 162 is disposed between the lower hub member 116 and the ruler member 102 as is shown in FIG. 9 thereby providing a sealed enclosure for the spirit level 122.

The spirit level 122 is supported by a pair of support brackets 164, 166 which are integrally formed on the upper member 118. In the same manner which has been previously described in connection with the embodiment 10 of the invention, shown in FIGS. 1–5, the support brackets 164, 166 each have a pair of arms 168, 170 which partially encircle the cylindrical split level 122 and hold the spirit level 122 securely. As previously described, the support brackets 164, 166 are made of a resilient plastic which enables the support brackets 164, 166 to flex to a degree in order to absorb shock forces encountered by the rotatable carpenter's level 100.

The surfaces 172, 174 or the ruler each include a circular array of indicia 176,178 which facilitates making angular measurements in cooperation with the level 122.

Figures 13, 14:
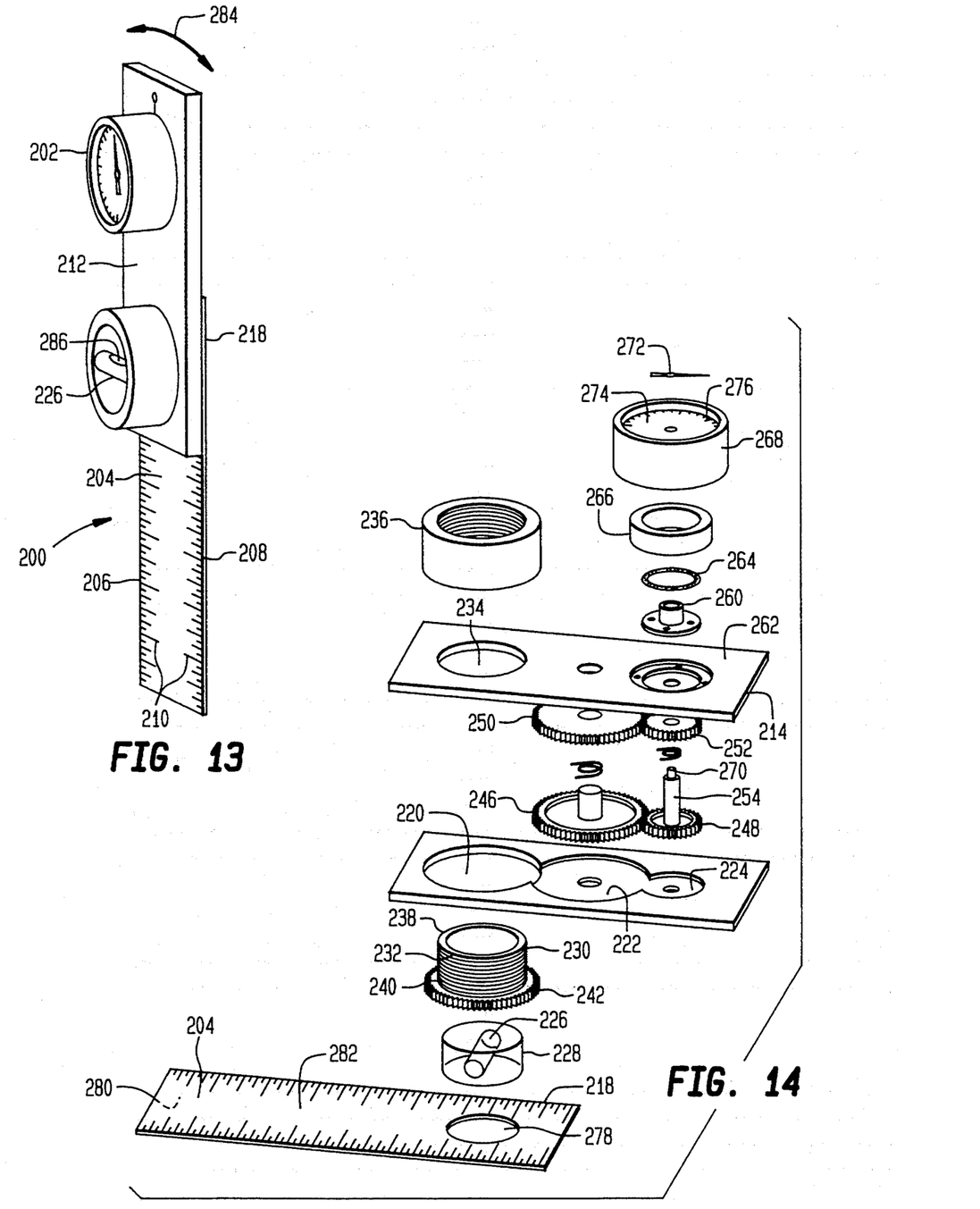
FIG. 13 is a perspective view of still another embodiment of the invention which incorporates a dial readout.
FIG. 14 is an exploded view of the embodiment shown in FIG. 13.

FIGS. 13 and 14 show another embodiment of the carpenter's level 200 according to the present invention which includes a dial readout 202 to indicate angular position.

As is shown in FIG. 13, the embodiment 200 incorporates a ruler 204 which has along its edges 206, 208 a plurality of indicia 210 for making measurements. A level support member 212 is formed by a pair of elongated end plates 214, 216 which are pivotally mounted on one end 218 of the ruler 204. The end plates 214, 216 have internal cavities 220, 222, 224 formed thereon in order to accommodate various internal components as described below.

A bubble level 226 is mounted within a transparent glass or plastic cylinder 228 located in the housing 230 and the housing 230 is rotatably mounted in the cavity 220 formed in the rear end of plate 216. A portion 232 of the housing 230 passes through the hole 234 in the end plate 214. The housing 230 is held in place by a threaded cap 236 which engages the end 238 of the portion 232. The lower end of the housing 230 is connected to a gear 242. The gear 242 is in mesh with gears 246, 248, 250, 252 which drive a shaft 254. The gear 242 is connected to the ruler 204 by means of screws which are not shown.

The shaft 254 passes through a bushing 260 which is mounted on the surface 262 of the end plate 214 and a seal 264.

The shaft 254 also passes through a ring 266 and through a housing 268. The upper end 270 of the shaft 254 is connected to an indicator needle 272.

The housing 268 has a circular dial face 274 which includes a plurality of indicia 276 for making angular measurements. An aperture 278 in the ruler 204 permits viewing the bubble level 226 from the bottom 280 of the ruler 204 in addition to the top 282 of the ruler.

During use, the ruler 204 may be placed on a surface whose angle is to be measured. The level support member 212 is rotated by hand in the directions shown by the arrow 284 in FIG. 13 until the bubble 286 in the bubble level 226 is appropriately centered. The rotation of the level support member 212 relative to the ruler 204 causes the gears 246, 248, 250, 252 to drive the indicator needle 272 thereby providing a direct reading on the dial face 274 corresponding to the angle of the surface.

FIGS. 15-21 show another embodiment 300 of the carpenter's level according to the present invention in which a pair of levels 302, 304 are mounted in a housing 306 which is mounted on the end 308 of a ruler 310. The ruler 310 includes a plurality of indicia 314, 316, 318 for making measurements. The ruler 310 also includes a pair of slots 320, 322 which cooperate with a slider member 324 in a manner which will be presently described.

Figure 15:
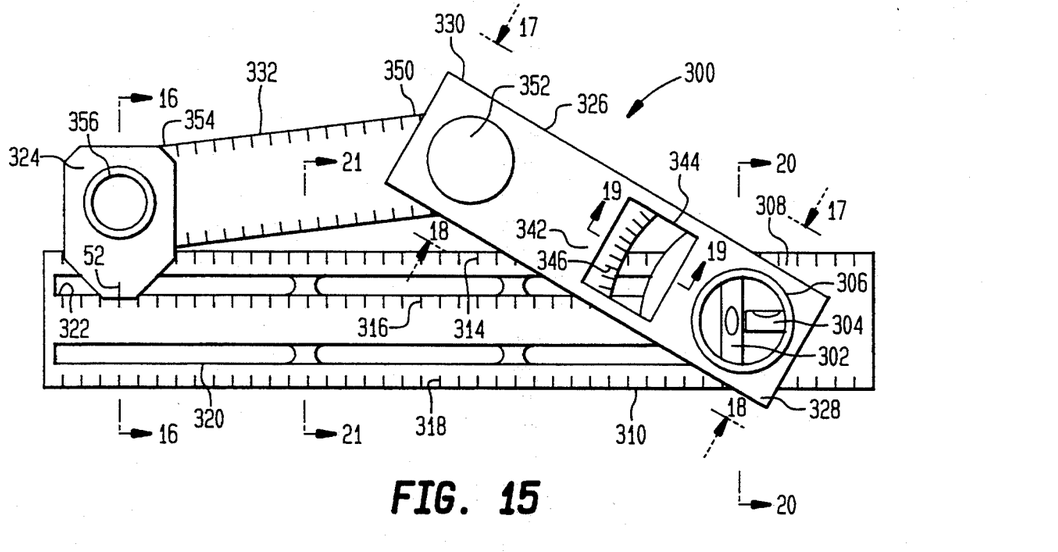
FIG. 15 is a plan view of another embodiment of the invention.

The embodiment 300 includes a first elongated member 326 which has a first end 328 which is pivotally connected to the housing 306 and a second end 330 which is pivotally connected to a second elongated member 332.

Figure 17:
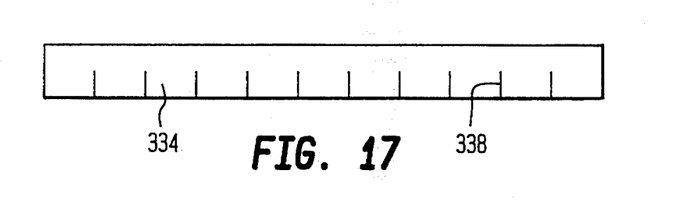
FIG. 17 is a view taken along the line 17—17 in FIG. 15.
Figure 18:
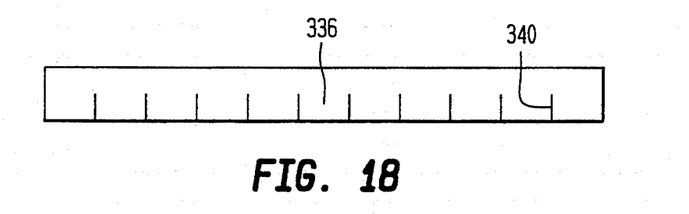
FIG. 18 is a view taken along the line 18—18 in FIG. 15.
Figure 19:
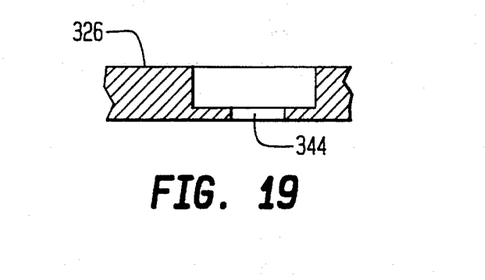
FIG. 19 is a cross-sectional view taken along the line 19—19 in FIG. 15.
Figure 20:
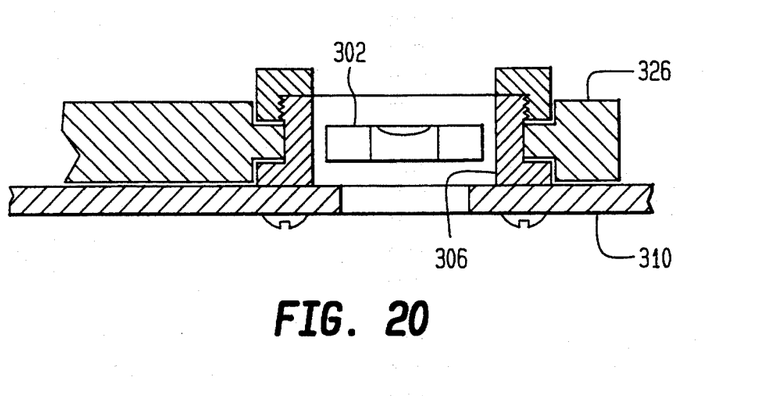
FIG. 20 is a cross-sectional view taken along the line 20—20 in FIG. 15.
Figure 21:
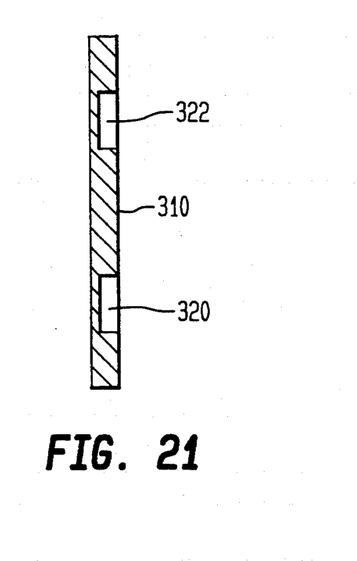
FIG. 21 is a cross-sectional view taken along the line 21—21 in FIG. 15.

As is shown in FIGS. 17 and 18, the surfaces 334, 336 of the first elongated member 326 each include a plurality of indicia 338, 340 for making measurements. An intermediate portion 342 of the first elongated member 326 includes an aperture 344 adjacent to which a plurality of indicia 346 are provided. The aperture 344 enables viewing of the ruler 310 and the indicia 346 facilitate making measurements of the angle formed between the ruler 310 and the first elongated member 326.

The end 350 of the second elongated member 332 is connected to the first elongated member 326 by means of the pivot 52 and the end 354 of the second elongated member 332 is pivotally connected to the slider member 324 by means of the pivot 356. The slider member 324 includes an index mark 352 for making measurements along the ruler 310.

Figure 16:
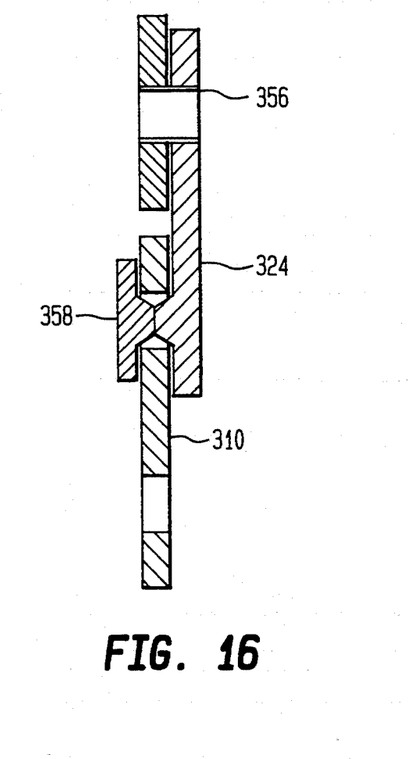
FIG. 16 is a cross-sectional view taken along he line 16—16 in FIG. 15.

A magnet member 358 is provided to maintain contact between the slider member 324 and the ruler 310. As is shown in FIG. 16 the magnet member 358 projects through the slot 322 and is in contact with the slider member 324.

The levels 302, 304 facilitate maintaining the ruler 310 in the level position and the position of the first and second elongated members 326, 332 can then be adjusted relative to the ruler 310 using the slots 320, 322 thereby facilitating the making of a plurality of angular measurements.

The foregoing specific embodiments of the present invention as set forth in the specification herein is for illustrative purposes only. Various changes and modifications may be made within the spirit and scope of this invention.

What is claimed is:

1. A rotatable carpenter's level comprising
a ruler member, having a first end,
level means mounted on said ruler member,
a first elongated member having a first end a second end, with said first end of said first elongated member pivotally connected to said first end of said ruler member,
a second elongated member having a first end and a second end with said first end of said second elongated member pivotally connected to said second end of said first elongated member,
a slider member slidably mounted on said ruler member and with said second end of said second elongated member pivotally connected to said slider member,
with said first elongated member having an intermediate portion including means for viewing an adjacent portion of said ruler member and indicia for measurement of the angular relationship between said first elongated member and said ruler.

2. A rotatable carpenter's level according to claim 1 in which said ruler member, and said first elongated member each include a plurality of indicia.

3. A rotatable carpenter's level according to claim 1 in which said slider member further comprises a magnetic member.

4. A rotatable carpenter's level according to claim 1 in which said slider member further comprises an index mark for making measurements of the position of said slider member relative to said ruler member.

* * * * *